May 19, 1931.                C. L. ROSS                1,805,600
                            SPRING DEVICE
                         Filed April 27, 1929
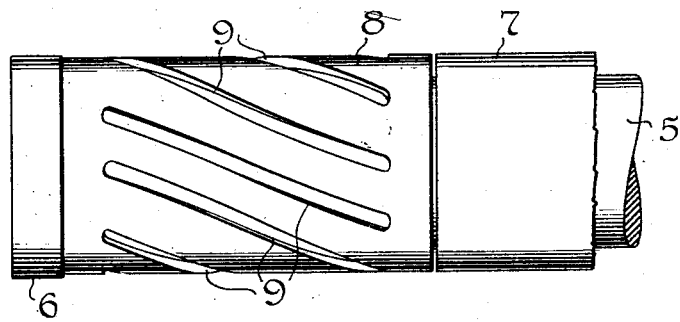
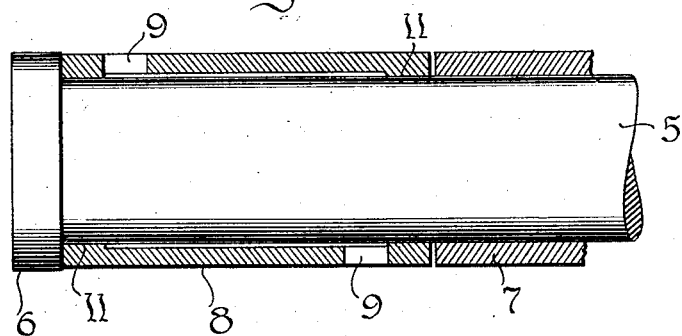
Inventor
Charles L. Ross
By Dodge and Sons.
Attorneys Patented May 19, 1931

1,805,600

UNITED STATES PATENT OFFICE

CHARLES L. ROSS, OF WASHINGTON, DISTRICT OF COLUMBIA

SPRING DEVICE

Application filed April 27, 1929. Serial No. 358,545.

This invention relates to spring devices, and particularly to buffing or shock absorbing springs.

The object of the invention is to produce a metallic or other spring buffer which will suddenly arrest a moving part, without destructive shock, and which has little or no tendency to cause the arrested part to rebound.

While generally applicable to accomplish the result stated, the invention has been successfully employed in automatic firearms, and will be described as developed for this field of use.

In the drawings, which show the parts at about twice normal size,—

Fig. 1 is a side elevation of the buffer and one type of mount with which it is used.

Fig. 2 is a longitudinal section.

A guide rod 5 is provided at one end with an outwardly extending collar or flange 6, which is to resist the buffing stress. Guided to reciprocate longitudinally on the guide 5, but not to rotate thereon, is a sleeve member 7 which is the member to be arrested. Ordinarily the member 7 would be connected to the bolt-action or some other part of a machine rifle, machine gun, or other automatic arm, and it is within the scope of the invention to arrest any reciprocating part.

The buffing spring consists of a hollow cylindrical shell or sleeve 8 which encircles the guide 5 and is positioned between the collar 6 and the reciprocating member 7 in such a way that when the reciprocating member 7 moves to the left it will strike the right hand end of the member 8, which at such time is supported at its left hand end by the collar 6. The sleeve 8 is provided with a plurality of quick pitch slots 9 which extend entirely through the shell and which terminate short of the ends of the shell 8. If desired the end portions of the shell 8 may be slightly thickened, as indicated at 11, but in any event the shell 8 fits freely on the supporting guide 5 and does not seize or grip the same in the normal functioning of the buffing device.

In the drawings eight slots 9 are suggested, but the number may be varied. The proportions illustrated are such that the width of the slot is between a half and a third the width of the intervening metal, but these proportions may also be departed from.

The function of the buffer is to arrest the member 7 at the leftward limit of its motion and to absorb the excess energy without developing destructive shock. In most automatic firearms it is the practice to develop excess power in the action to make sure there shall be no malfunction, and it follows that the resulting impacts are quite severe. The buffing sleeve 8 is so contrived that it will yield slightly, and this yielding is sufficient to prevent destructive shock.

It will be observed that the spiral slots 9, and consequently the intervening strips of metal, are at angles less than thirty degrees to the geometrical elements of the cylinder, and it follows from this that the yielding of the cylinder, under longitudinal stresses, necessarily produces a twisting or rotary motion of the ends of the sleeve relatively to each other. It follows from the steep angle of the pitch of the slots 9 that the linear motion in the rotary path will exceed the linear motion in the direction of the axis of the sleeve. This is believed to have an important effect in the action of the buffer.

The buffer acts as an energy absorber and restores practically none of the absorbed energy to the reciprocating member 7. The exact cause for this action is not known with certainty, but it is believed to be occasioned by the fact that at the moment of impact there is heavy pressure between the reciprocating member 7 and the end of the sleeve 8. The longitudinal compression of the sleeve 8 is necessarily attended by relative rotation of its two end portions, and this develops an energy absorbing friction resistance between the ends of the sleeve and the two coacting abutments. In firearms, and in most cases in which a device of this sort would be used, the member 7 does not rotate relatively to the guide 5 and collar 6, but even if it were normally free to rotate still its own inertia would preclude its immediate assumption of rotary motion so that the frictional engagement with the end of the sleeve would exist in any event and result in the absorption of energy. Furthermore, on the return movement of the sleeve 8, after shock, the elongation is far less than the rotary movement and the recoil effect on the reciprocating member 7 is decidedly checked.

In any event, it is an established fact that a sleeve of this character placed between an abutment and a reciprocating element so as to receive the shocks of impact delivered by the reciprocating element in the direction of the axis of the sleeve, will arrest the reciprocating element without undue shock and without serious tendency toward recoil. Of course, the sleeve must be designed with reference to the mass of the body to be arrested, the velocity with which it is moving at the time of impact, and other details, but it can readily be accommodated by varying such factors as its diameter in relation to its length, the thickness of the shell, the number and pitch of the slots, and the relation of the width of the slots to the intervening metal. A convenient method of arriving at the final dimensions is to design a sleeve to be slightly thicker than the intended final dimension, and then proceeding, by trial and error, grinding off the outer surface until the proper buffing action is secured. Generally speaking, the buffer will be constructed of highly elastic metal, such as steel, but it can be constructed of other elastic materials with attendant variations in its operative characteristics occasioned by the coefficient of elasticity and the degree of resiliency of the material used.

What is claimed is,—

1. A buffer comprising a hollow cylinder arranged to be loaded in the direction of its axis and having a plurality of quick pitch spiral slots extending through its walls, and characterized by the capability of absorbing and dissipating energy of impact without substantial recoil.

2. A buffer comprising a hollow metallic cylinder arranged to be loaded in the direction of its axis and having a plurality of quick pitch spiral slots extending through its walls, and characterized by the capability of absorbing and dissipating energy of impact without substantial recoil.

3. A buffer comprising a hollow cylinder arranged to be loaded in the direction of its axis, and having a plurality of spiral slots extending through its walls and making angles not exceeding 30° with the geometrical elements of the cylinder.

4. A buffer comprising a hollow metallic cylinder arranged to be loaded in the direction of its axis, and having a plurality of spiral slots extending through its walls and making angles not exceeding 30° with the geometrical elements of the cylinder.

5. A buffer structure comprising in combination two abutments movable toward and from one another and a hollow cylindrical shell interposed between the same to enter into force transmitting engagement with the abutments in the direction of its axis, said shell being rotatable relatively to at least one abutment and having a plurality of quick pitch spiral slots extending through its walls, said shell being characterized by the capability of absorbing and dissipating energy of impact without substantial recoil.

6. A buffer structure comprising in combination two abutments movable toward and from one another, and a hollow cylindrical shell interposed between the same to enter into force transmitting engagement with the abutments in the direction of its axis, said shell being rotatable about its axis relatively to both abutments and having a plurality of quick pitch spiral slots extending through its walls, said shell being characterized by the capability of absorbing and dissipating energy of impact without substantial recoil.

In testimony whereof I have signed my name to this specification.

CHARLES L. ROSS.